United States Patent [19]
Wally, Jr. et al.

[11] Patent Number: 4,887,123
[45] Date of Patent: Dec. 12, 1989

[54] BOXLIGHT FOR PROJECTION PHOTOREPRODUCTION

[75] Inventors: Joseph H. Wally, Jr., Shawnee Mission; Herbert W. Pace; Ronald L. Halsey, both of Lenexa, Kans.

[73] Assignee: Opti-Copy, Incorporated, Lenexa, Kans.

[21] Appl. No.: 99,090

[22] Filed: Sep. 21, 1987

[51] Int. Cl.$^4$ ............................................. G03B 27/54
[52] U.S. Cl. ...................................... 355/30; 355/30; 355/37
[58] Field of Search ...................... 355/30, 70, 67, 37

[56] References Cited

U.S. PATENT DOCUMENTS

| | | |
|---|---|---|
| 1,562,757 | 11/1925 | Hammond . |
| 2,356,694 | 8/1944 | Potter et al. ............................ 95/81 |
| 3,044,351 | 7/1962 | Patterson ............................. 355/70 |
| 3,375,366 | 3/1968 | Scheppe ............................. 240/47 |
| 3,669,538 | 6/1972 | Fowler ................................ 355/67 |
| 3,700,314 | 10/1972 | Busby, Jr. ........................... 350/314 |
| 3,777,135 | 12/1973 | Rees ............................ 240/41.35 R |
| 3,850,523 | 11/1974 | Skavnak ............................. 355/70 |
| 3,870,924 | 3/1975 | Helmuth ......................... 315/200 A |
| 3,936,672 | 2/1976 | Tanaka ............................... 355/30 |
| 3,981,565 | 9/1976 | Karasawa ........................... 350/266 |
| 3,986,018 | 10/1976 | Ishii ................................... 355/30 |
| 3,998,546 | 12/1976 | Wally, Jr. et al. ..................... 355/53 |
| 4,189,229 | 2/1980 | Guillaume .......................... 355/67 |
| 4,298,275 | 11/1981 | Critchlow et al. ................... 355/71 |
| 4,469,407 | 9/1984 | Cowan et al. ...................... 350/314 |
| 4,582,406 | 4/1986 | Wally ................................ 353/57 |
| 4,728,993 | 3/1988 | Hilgers .............................. 355/30 |

Primary Examiner—Monroe H. Hayes
Attorney, Agent, or Firm—Kokjer, Kircher, Bradley, Wharton, Bowman & Johnson

[57] ABSTRACT

A boxlight which serves as a source of light projected through a film transparency and focused on a photosensitive film in order to project the image on the transparency onto the film. The boxlight has an improved light source formed by pulsed xenon lamps arranged end to end to approximate a circle centered on the optical axis of the photoreproduction machine and contained in a plane perpendicular to the optical axis. Reflectors are provided in a circular arrangement extending around the light source circle and include reflective panels oriented at about 15° to the optical axis. The circular configuration of the light counters cosine fourth losses and makes the light intensity pattern more uniform at the film plane.

26 Claims, 6 Drawing Sheets

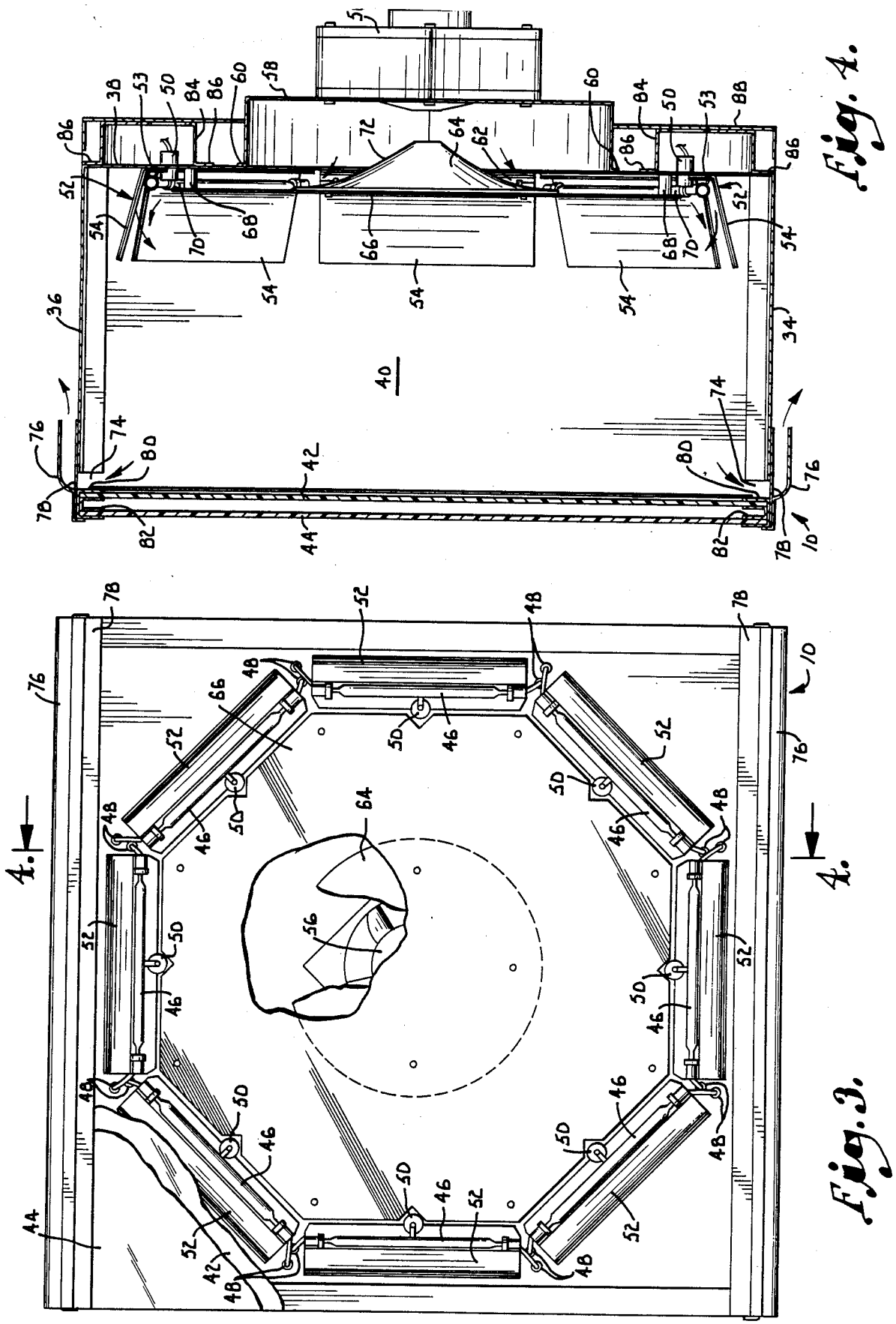

BOXLIGHT FOR PROJECTION PHOTOREPRODUCTION

BACKGROUND OF THE INVENTION

This invention relates generally to the field of photoreproduction and deals more particularly with an improved boxlight for a projection type photoreproduction system.

U.S. Pat. No. 3,998,546 and U.S. Pat. No. 4,582,406 disclose photoreproduction systems in which high quality photographs are produced by projection photography involving the projection of light onto photosensitive film through an image on a film transparency. The light emanates from high intensity lamps which are housed in a light box known in the industry as a boxlight. This type of process is commonly used in color photography where the transparency is a screened color separation containing halftone dots.

Photoreproduction equipment of the type disclosed in the above referenced patents has been commercially successful and has in fact nearly largely supplanted the prior practice which involved hand stripping halftone separations and other elements together prior to printing of a composite color print. However, prior photoreproduction machines of this type are not wholly free of problems, and the problems that remain are of particular concern in extremely high quality halftone work such as that used in the printing of advertisements in mass circulation periodicals. One of the most troublesome problems is that of light falloff near the extremities of the image plane. Although this problem is complicated from an optical standpoint and disagreement remains as to all of the factors which cause it, there is general agreement that the optical properties of lenses and an effect commonly referred to as "cosine fourth" losses are contributing factors.

Virtually all lenses provide the sharpest detail in the center of the image area near the optical axis of the lens. Because light intensity varies inversely with the square of the distance it travels and because the distance light travels in an optical system increases as it moves farther off axis, the falloff in intensity increases rapidly toward the edges of the image plane. In addition, a specified unit of the film located on the optical axis "sees" a circular iris as a circle while an off axis film unit "sees" the same iris as an oval. The oval becomes more narrow as the distance from the optical axis increases, and the areas near the perimeter of the film image are thus exposed to less light because of this factor also.

The cosine fourth effect is more subtle but has long been known to optical physicists. This phenomenon gets its name from the fact that the illumination of a point on the image plane varies with the fourth power of the cosine of the angle between the optical axis of the lens and the chief light ray. Since the cosine decreases as the angle increases, the larger angles of rays located far off axis results in relatively large cosine fourth losses near the periphery of the image plane. Consequently, it is evident that lens resolution and cosine fourth phenomena are additive and result in the most serious problems near the perimeter, since both are most pronounced near the peripheral areas of the image plane.

State of the art techniques in lens design and manufacture can produce high quality lenses that are capable of at least in large part compensating for the falloff that is caused by the lens. However, this is not accomplished without introducing unusual aspects such as requiring operation in a prescribed narrow spectral band for which the lens is designed, excessive lens weight (upwards of 30 lbs.), and high lens cost ($10,000 or more per lens). Even then, the cosine fourth losses remain and can create unacceptable quality problems in the finished print.

Any quality reduction at all is of great concern in modern day halftone work which must be of the highest quality. Examples are the double page advertising spreads often found in mass circulation magazines or books and any color halftone work as large as 11×17" or larger. In this type of high quality work, even the slightest falloff in the illumination at the ends or corners (or undue light concentration at the center or elsewhere) renders the optical system incapable of recording halftone dots at the two ends of the gray scale (the highlights and shadows of the picture).

In the manufacture of "flats" (large formats containing many pages ready to plate for large-press printing), the common expectation is to hold 1% to 99% dots of the standard 150 line screen count. These dots in a 150 line screen are only 0.000625 inch in diameter, so it is easy to appreciate the difficulty of retaining them in a second generation film. Cosine fourth losses and other problems in the illumination provided by the boxlight can make it impossible to meet the industry expectation, even if the best available lenses are used.

Even though cosine fourth losses have been recognized in projection as well as camera work, there have been few approaches made to the problem that have been successful in eliminating it. Solutions that have been proposed for use in other types of optical systems such as document photocopying (see Fowler U.S. Pat. No. 3,669,538 and Critchlow et al. U.S. Pat. No. 4,298,275) are unsuited for projection photography in large format printing and are in any event of questionable effectiveness in solving the problem of cosine fourth losses.

Such proposals as those suggested in the aforementioned patents would be unsuited for use in projection photoreproduction for myriad reasons. For example, the transparency must be oriented with its long axis horizontal in some cases and vertical in other cases, depending on the ultimate sheet size, the layout of the printed piece, and the number of pages on the "flat". An eight page flat made up of 8½×11 inch pages may measure as little as 22×34 inches if the pages are to be cut apart or as little as 23×35 inches if the pages are to be folded up into a "signature". In either case, the arrangement of the pages is two rows disposed one above the other with each row including four pages and each page oriented vertically. This is the arrangement shown in FIG. 7. However, if two of the adjacent pages are ultimately to be used as a double page spread, they must be photographed horizontally (as exemplified by "Exposures 5 and 6" in FIG. 7). On the other hand, if that same double page spread is to be part of a 16-page flat, all of the 8½×11 inch pages on the flat will be horizontally composed, and the double pages 11×17 inch area which is to be photographed as an entity must be filmed in the projector with the original transparency held vertically on the subject holder. This is illustrated in FIG. 8, with Exposures 3 and 6 constituting the double page spread.

As another example, the 8½×11 inch or 9×12 inch pages in a 32 page flat are composed vertically in rows (see FIG. 9), while the pages in a 64 page flat are composed horizontally. Again, the lighting system is required to accommodate both horizontal and vertical orientations of rectangular transparencies. Other situations may require the transparency to have a 45 degree attitude or some other skewed orientation.

For these reasons, a lighting system which is specifically designed in a shape that accommodates only horizontal or only vertical attitudes (or any other fixed attitude) is unacceptable for use in multiple image step-and-repeat photography which uniquely requires that all attitudes be handled. Accordingly, light falloff that is accentuated in any direction cannot be tolerated because the lighting effect in that direction would be lacking and would detract from the quality of the finished product when its long axis must be oriented in the direction of maximum light falloff. Stated another way, the light distribution should be symmetrical about the optical axis of the photographic system.

SUMMARY OF THE INVENTION

The present invention is aimed primarily at providing a boxlight for a projection type photoreproduction system which is specially constructed and arranged to backlight the transparency in a manner that amounts to an antidote for the harmful effects caused by the cosine fourth phenomenon. This is accomplished by arranging the light source and reflectors in a novel configuration which provides the weakest light on the optical axis and progressive intensity increase away from the optical axis in all directions radially of the image plane. As a consequence of this light distribution pattern, the cosine fourth effect is counteracted because its influence on the intensity pattern is exactly contrary to that achieved by the special high intensity light arrangement of the present invention.

We have found that by arranging the high intensity light source in a circular pattern which is centered on the optical axis and contained in a plane perpendicular to it, the desired light distribution pattern can be achieved. If reflectors are similarly arranged and properly oriented relative to the optical axis, the lighting pattern is enhanced and the cosine fourth problem is effectively eliminated. In a preferred form of the invention, the circular light arrangement is provided by a plurality of pulsed xenon lamps arranged end to end in a geometry approaching a circle. Each lamp has a reflector located radially outwardly from it so that the reflectors cooperate to form a somewhat larger circle. Concentration of the light on the periphery of the image and a gradual decrease in the light intensity toward the center is achieved by orienting the reflective surfaces at an angle of approximately 15° from the optical axis.

The considerable heat that is generated by the high intensity xenon lamps is dissipated by circulating air through the boxlight compartment in a unique flow pattern. Ambient air is introduced centrally to the back of the boxlight and encounters a cone shaped deflector which diverts the air outwardly in a radial path toward all of the lamp bulbs in a 360° pattern. This causes the air to be directed uniformly across the entire circumference of the circle defined by the lamps in order to effectively cool each lamp along the entire length of its glass envelope rather than only at the ends as has been the case in past systems. The air which flows past the lamps encounters the light reflectors which also serve as air baffles to direct the air smoothly toward the front of the boxlight compartment and out through amply sized vents at the top and bottom which permit the heated air to exit without turbulence. Heat is thus removed effectively from the boxlight compartment, and localized "hot spots" and other undesirable temperature conditions are avoided.

Another feature of the invention is the improved construction of the isolation chamber which isolates the film transparency from the heat that is generated in the boxlight compartment. A fan at the top of the isolation chamber draws air through the chamber in an upward circulation pattern which maintains the isolation compartment temperature low enough to avoid damage to the film transparency. The isolation chamber has a hinged side which can be opened to provide convenient access to the color filter panel and the diffuser panel and also to the lamps and other components in the boxlight compartment, all without detracting from the ability of the isolation chamber to perform its assigned function.

The boxlight is also strengthened structurally, and its backwall is stiffened to prevent vibration caused by operation of the fan. A stiffener channel and the fan shroud on its discharge side are arranged on the back panel of the boxlight at inclined angles in order to enhance the strength and stiffness of the back panel.

DESCRIPTION OF THE DRAWINGS

In the accompanying drawings which form a part of the specification and are to be read in conjunction therewith and in which like reference numerals are used to indicate like parts in the various views:

FIG. 3 is a front elevational view of the boxlight, with portions broken away for purposes of illustration;

FIG. 4 is a sectional view taken generally along line 4—4 of FIG. 3 in the direction of the arrows;

DETAILED DESCRIPTION OF THE INVENTION

Figure 1:
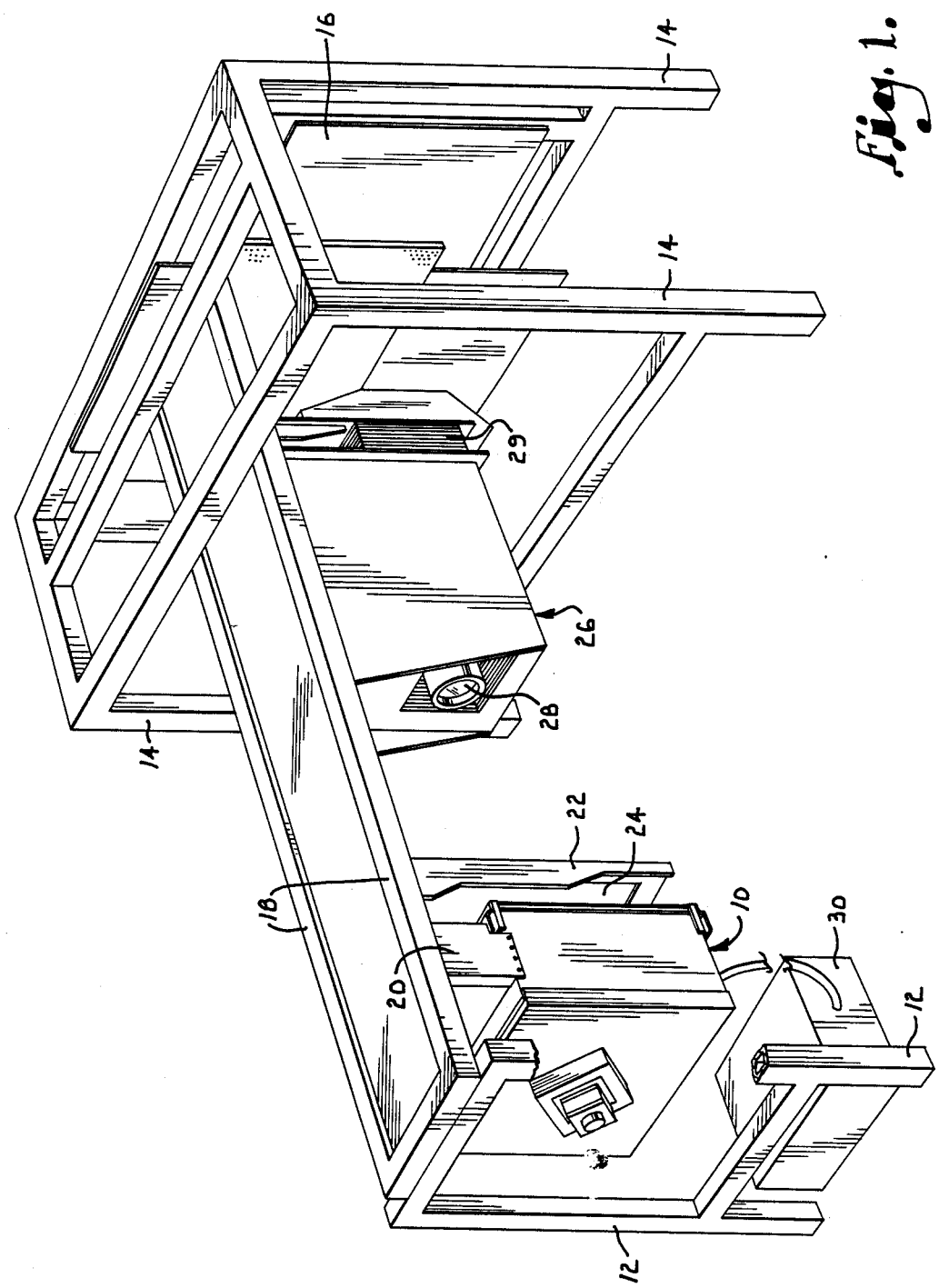
FIG. 1 is a perspective view of a projection type photoreproduction machine equipped with an improved boxlight constructed according to a preferred embodiment of the present invention, with portions broken away for purposes of illustration.
Figure 6:
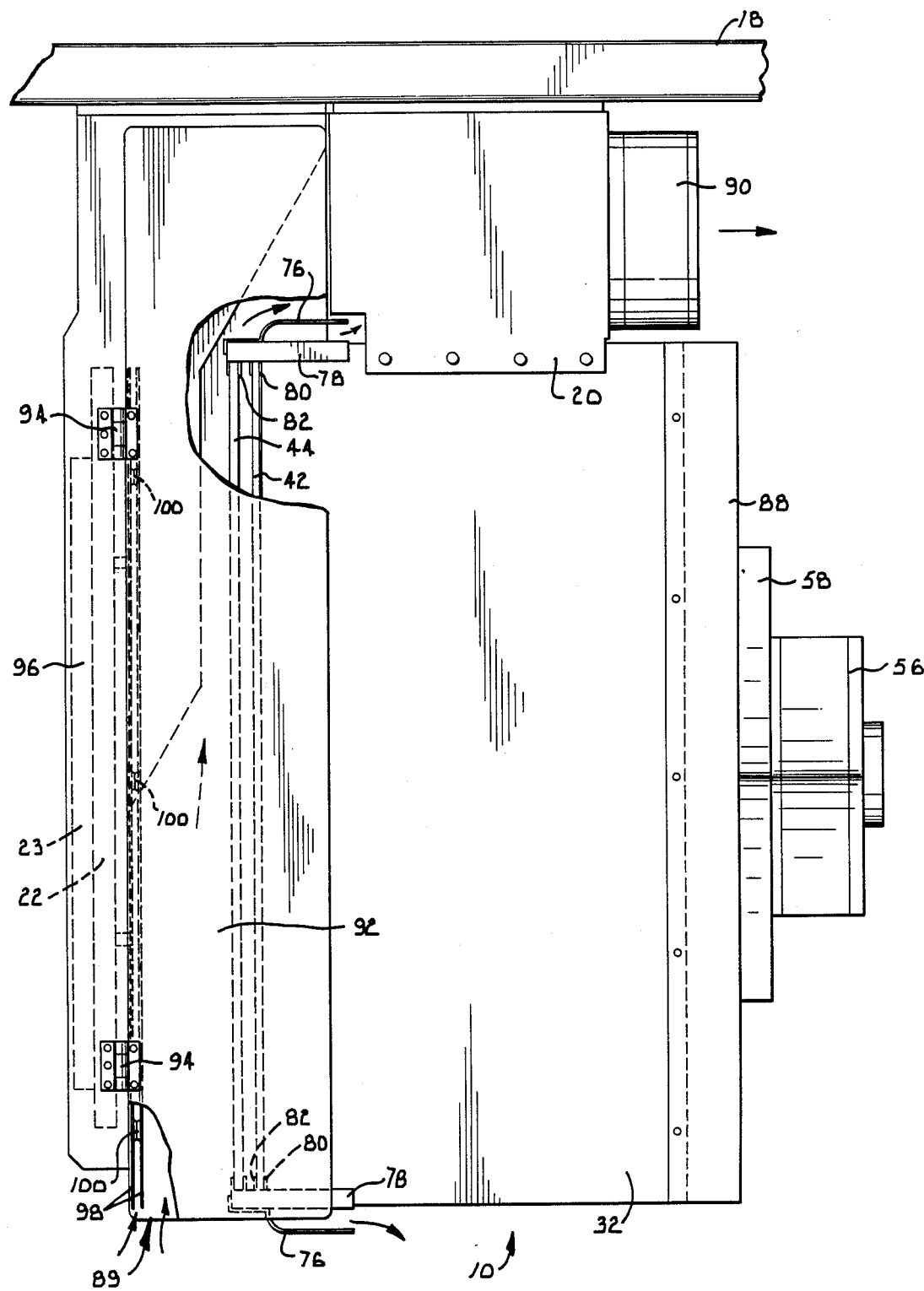
FIG. 6 is a side elevational view of the boxlight showing an isolation chamber applied thereto, with portions broken away for purposes of illustration.
Figure 7:
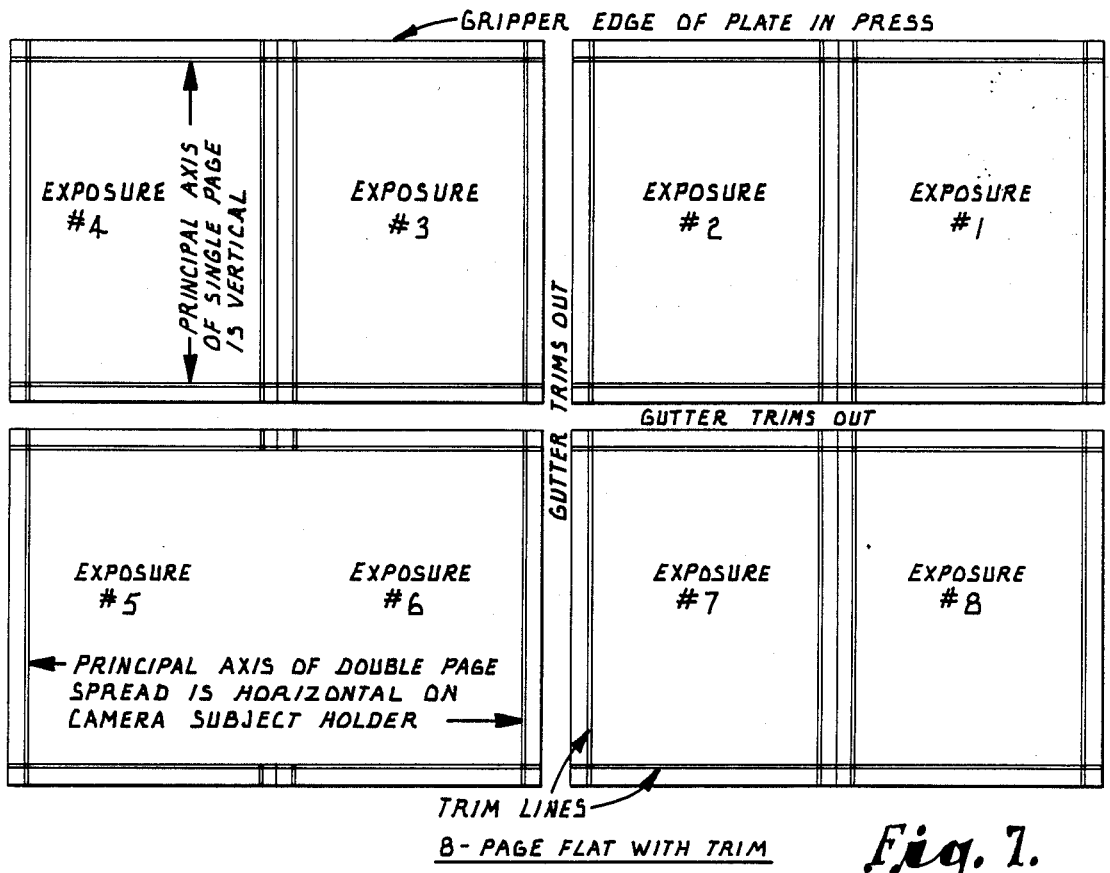
FIG. 7 is a diagrammatic view of the arrangement of the sheets in an 8 page flat with trim.
Figure 8:
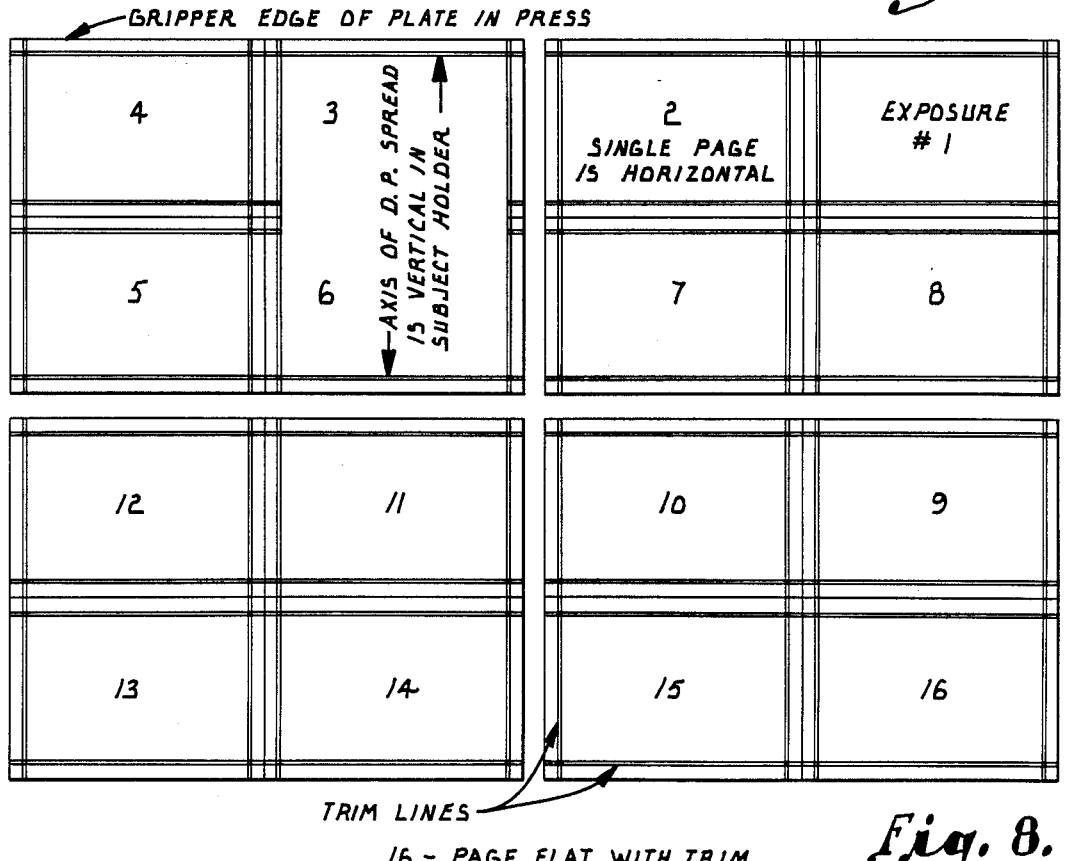
FIG. 8 is a diagrammatic view of the arrangement of the sheets in a 16 page flat with trim.
Figure 9:
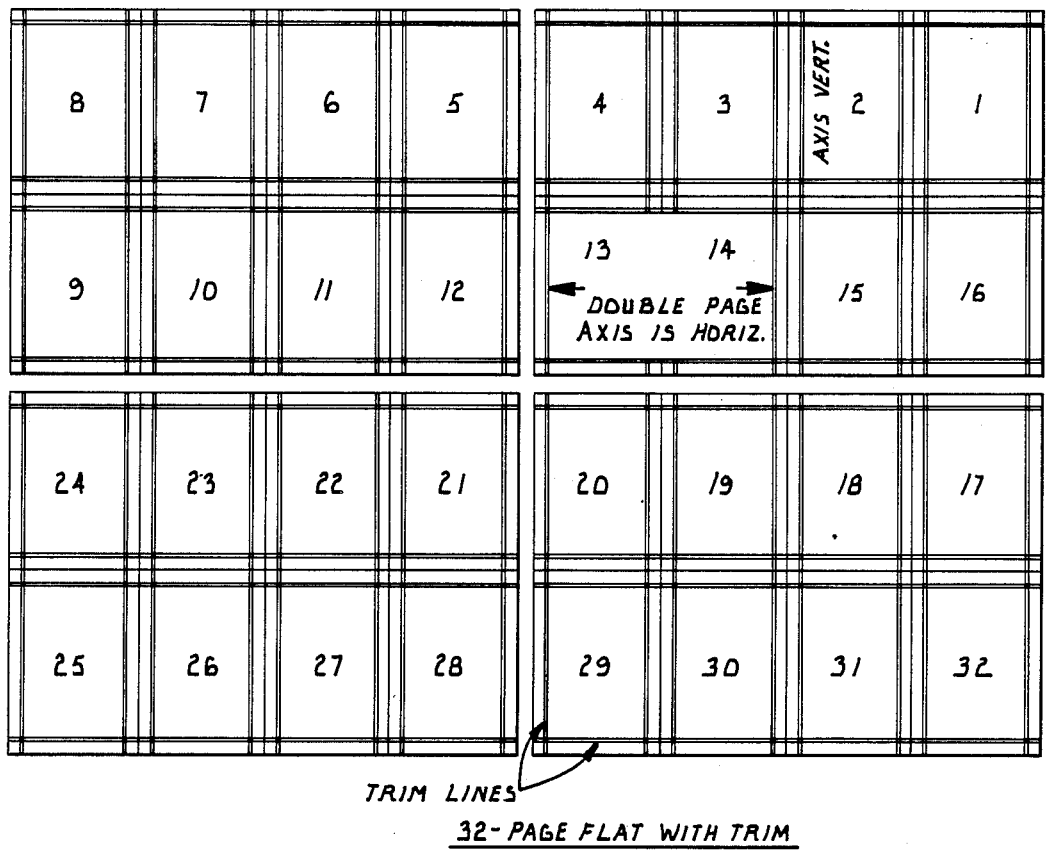
FIG. 9 is a diagrammatic view of the arrangement of the sheets in a 32 page flat with trim.

Referring now to the drawings in more detail and initially to FIG. 1, the present invention provides an improved boxlight which is generally identified by reference numeral 10 and which is useful in a projection photoreproduction machine of the type commonly used in high quality color photoreproduction. The machine includes a pair of supporting posts 12 at one end and four supporting posts 14 at the opposite end which cooperate to provide support for an easel 16. A pair of overhead structural members 18 are supported on the posts 12 and 14 and provide rails along which the boxlight 10 may be moved. The boxlight includes a hanger mounting bracket 20 which engages a plate affixed to the rails in order to permit the boxlight to be moved along them. The rails 18 also support a chase holder 22 which receives a chase 231 (FIG. 6). The chase 23 in turn holds a film transparency 24 carrying a photographic image which is to be projected onto photosensitive film (or plate) mounted on the easel 16. The chase holder 22 may be adjusted along the rails 18. A compartment 26 containing the objective 28 and bellows 29 is suspended from the rails 18 and also provides for adjustment of focus, the subject holder and lens being movable and the film holder being fixed. The optical head compartment 26 includes the objective lens 28 which focuses on the film the light rays that are projected through the transparency 24 from the boxlight 10. A power supply 30 provides electrical power for operating the pulsed xenon lamps in the boxlight.

Figure 2:
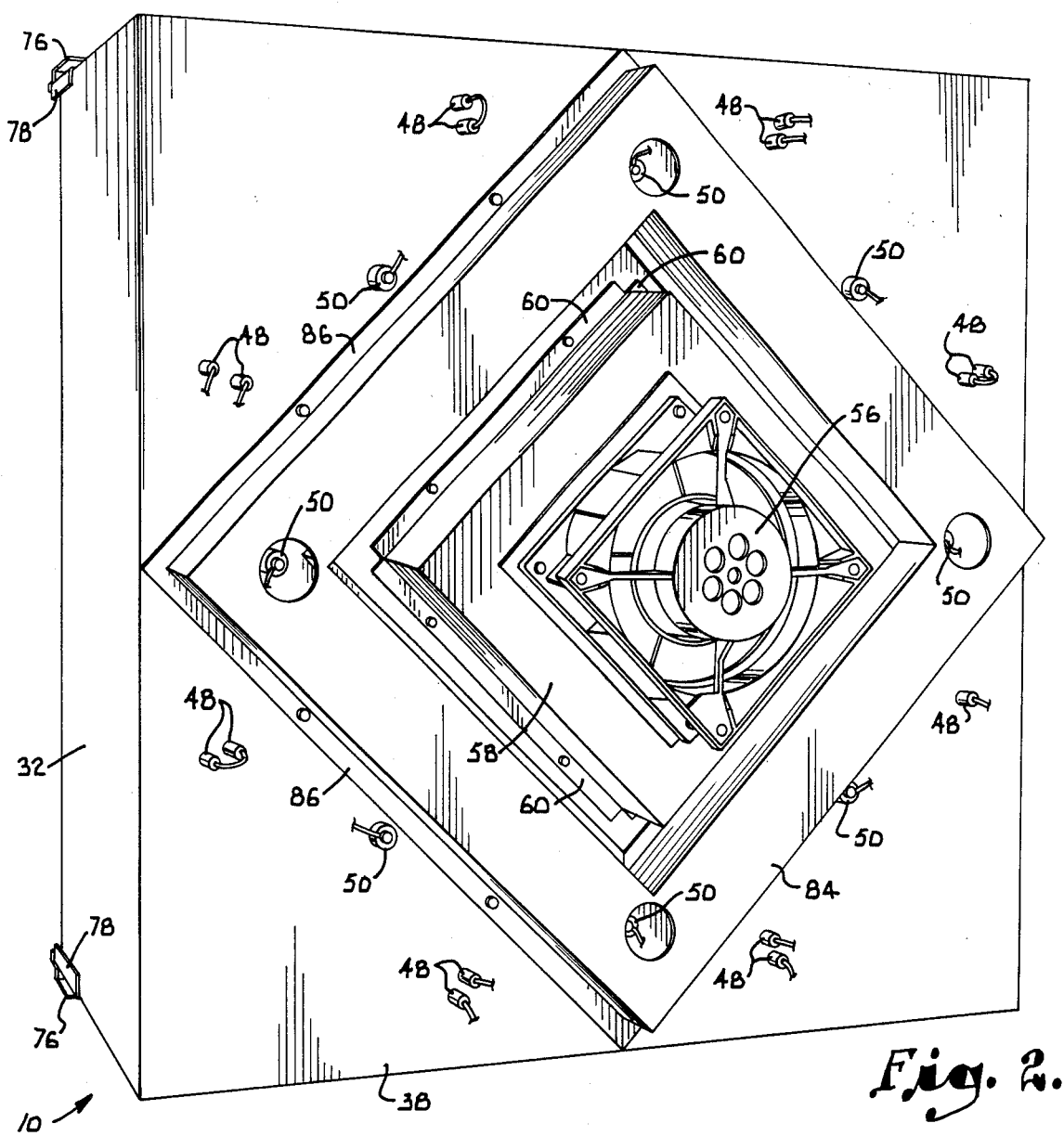
FIG. 2 is a rear perspective view of the boxlight on an enlarged scale, with the back cover panel removed.

The details of the boxlight 10 are best shown in FIGS. 2-4. The boxlight has a rectilinear configuration and includes parallel sides 32, a bottom panel 34, a top panel 36 and a rear panel 38. The boxlight 10 is open on its front face which is the side that faces toward the chase 22. The boxlight 10 thus provides a boxlight compartment 40 which is closed except for the front or open face which is normally covered by a light diffuser panel 42 and a color filter panel 44. The panels of the boxlight may be constructed of sheet metal or any other suitable material.

The function of the boxlight 10 is to provide high intensity light which is projected through the film transparency 24 and is focused by lens 28 onto the film which is held on the easel 16. In order to generate light in an improved manner, the boxlight is provided with a light source which takes the form of a plurality of pulsed xenon lamps 46 each having an elongated glass envelope. The lamps 46 are arranged generally end to end in a pattern approximating a circle, as best shown in FIG. 3. In the illustrated embodiment of the invention, eight of the xenon lamps 46 are used, and they are arranged in the octagonal pattern which approaches a circular shape, as best shown in FIG. 3. In the arrangement shown in FIG. 3, each of the eight lamps 46 is approximately 7½ inches long, and the lamps operate in pairs from one transformer.

It should be understood that the lamps 46 may be used in a number other than eight, although they should be arranged in a pattern that is close to a circle. A single circular lamp or a number of arcuate lamps could be used, although it has been found that straight lamps arranged in the manner shown in FIG. 3 approximate the circular geometry closely enough to achieve the desired benefits, as will be explained more fully. As a practical matter, 7½ inch straight lamps such as those shown in FIG. 3 are commercially available at present and are used in the present invention for this reason. However, it is to be understood that the number, length or shape of the lamps is not of critical importance; it is the nearly circular geometry defined by the lamps that results in the benefits achieved by the invention.

The circular configuration in which the lamps 46 are arranged occupies a plane which is perpendicular to the optical axis of the system which coincides with the optical axis of the objective lens 28. This plane is parallel to those occupied by panels 42 and 44. The circle defined by the lamps 46 is geometrically centered on the optical axis, and this symmetry about the optical axis result in each lamp 46 contributing equally to the generation of light that is used in the photoreproduction process.

The lamps 46 are mounted on the front surface of the back panel 38 of the boxlight, and this surface is preferably reflective. Each bulb 46 has a pair of end terminals 48 which apply current to its opposite ends and an igniter electrode 50 at its center which serves to ignite the lamp. The wiring for these terminals extends through the back panel 38.

In order to operate effectively in the type of photoreproduction system that is currently used commercially, the light source in the boxlight should meet certain practical parameters dictated primarily by size and geometrical considerations and by the characteristics of the film that is used in this type of process. The lamps 46 should be at least 5000 watt lamps. In addition, the diameter of the circle defined by the light source should not be less than about 15 inches and is preferably of a greater diameter; otherwise, the circle becomes so small that its peripheral lighting is too near the center of the image to counteract cosine fourth losses. Finally, the plane of the lamps should be spaced 12 inches or more behind the diffuser panel 42 in order to provide enough room for the light to spread out before it encounters the diffuser panel. In a preferred form of the invention, the lamps are 6000 watt lamps, the diameter of the circle they define is about 24 inches, and the circle is in a plane spaced approximately 10 to 12 inches behind the diffuser panel. It should be noted that these parameters have achieved the desired results in a commercial photoreproduction system which gives short film exposures (5 to 10 seconds) at 530 nanometers (plus or minus 25 nanometers) which is the wavelength passed by the green color filter panel 44.

The light which is generated by the lamps 46 is reflected toward the chase holder 22 and the chase applied thereto by a plurality of reflectors 52 arranged in the general configuration of a circle which is concentric with and somewhat larger than the circle defined by the lamps 46. Each lamp 46 has one of the reflectors 52 associated with it. Each reflector has a relatively short, flat base 53 which is secured to the front face of the back panel 38 at a location behind and spaced slightly from the corresponding lamp 46. Extending from the base 53 of each reflector is a flat reflective panel 54 which occupies a plane oriented at an angle of approximately 15° outwardly from the optical axis of the machine or 105° measured from the plane of the light source outwardly. Each reflective panel 54 angles outwardly as it extends away from panel 38, and each panel 54 is spaced radially outwardly from and has approximately the same length as the corresponding lamp 46. The reflective surface of each reflector 52 is provided with an aluminum mirror finish in order to enhance the reflection of light.

The lamps 46 generate considerable heat when energized, and it is necessary to cool them in order to prevent overheating of the boxlight compartment 40 and lamp failure. The circulation of ambient air for cooling of the lamps 46 and reflectors 52 is achieved by an electric fan 56 mounted on the back panel 38 of the boxlight. The back or intake side of fan 56 is open to the atmosphere so that it can draw in ambient air. The discharge side of the fan is provided with a generally square, box-like shroud 58 on which the fan is mounted. The shroud 58 has outurned flanges 60 on its front edges which are suitably secured to the back side of the back panel 38 of the boxlight. The shroud 58 serves not only to receive the discharge air from the fan but also has a stiffener to prevent the back panel 38 or other components from vibrating during operation of the fan. In order to strengthen and stiffen the back panel 38, the four edges of shroud 58 are skewed relative to the horizontal and vertical edges of the boxlight panel 38. Preferably, the edges of shroud 58 are oriented at approximately 45° relative to the vertical and horizontal edges of the boxlight, as best shown in FIG. 2.

As best shown in FIG. 4, the back panel 38 is cut away at a location inside of shroud 58 to provide a circular air intake opening 62 for the boxlight. The intake opening 62 is centered on the optical axis of the machine, and the air that is directed toward opening 62 by the fan 56 and shroud 58 initially flows generally parallel to and along the optical axis. A generally cone-shaped deflector 64 is mounted on the back side of a reflector panel 66 which covers but is spaced forwardly from the intake opening 62. Panel 66 is secured to panel 38 by a plurality of standoffs 68 which serve both to mount the reflector panel 66 and to space it forwardly from panel 38 in order to define an annular slot 70 for entry of cooling air into the boxlight compartment 40.

The deflector 64 is located centrally in the intake opening 62 and is symmetrical with respect to the optical axis of the system. The deflector 64 has a generally conical and slightly concave deflecting surface 72 which faces toward the incoming air and functions to fan it out in a radial direction relative to the circle defined by the lamps 46. The air which encounters the deflecting surface 72 is fanned out smoothly in all directions and is directed toward the slot 70 which distributes the air in equal amounts to all of the lamps 46. Slot 70 is located adjacent to the lamps 46 and directs the air along the entire length of each lamp 46 in a manner to distribute the air uniformly along the entire circumference of the circle defined by the lamps. The front face of the reflector panel 66 is preferably provided with a reflective coating in order to assist in reflecting light toward the front face of the boxlight 10.

The cooling air which is circulated past the lamps 46 and reflectors 52 by fan 56 is discharged from the boxlight compartment 40 through top and bottom vent slots 74 located adjacent to the front face of the boxlight immediately behind the diffuser panel 42. The slots 74 extend the entire width of the boxlight and thus provides ample venting of the air. A curved baffle 76 is mounted outwardly of each vent slot 74 on a bracket 78. The brackets 78 are mounted on the top and bottom panels 34 and 36 of the boxlight 10. Each of the baffles 76 is arranged to direct the air which vents through slots 74 in a direction to the rear or away from the chase 22.

The top and bottom brackets 78 also cooperate with angle members 80 and U-shaped channels 82 to provide slideways in which panels 42 and 44 are received. The slideways extend along the front of the boxlight 10 at the top and bottom and are spaced apart so that the filter panel 44 is spaced slightly forwardly from the diffuser panel 42. The diffuser panel 42 serves to diffuse the light which is generated within the boxlight compartment, while the filter panel 44 preferably filters out undesirable wavelengths. The diffuser panel may be flashed opal glass or milk-white PLEXIGLASS. The color filter panel 44 may be dark green PLEXIGLASS.

In addition to the stiffening that is provided by the fan shroud 58, further stiffening and strengthening of the back panel is provided by a stiffening channel 84 which is mounted on the back side of panel 38. The stiffening channel 84 is generally square and has outurned flanges 86 on its front edges which are suitably secured to panel 38. The stiffening channel 84 is located outwardly from the fan shroud 58 and has its edges oriented parallel to those of the fan shroud or skewed at 45° relative to the edges of panel 38. This further enhances the strengthening and stiffening provided by the channel 84. In addition, wiring for the fan, lamps and other components can be routed within the stiffening channel 84. Channel 84 is normally covered by a flanged cover panel 88 which may be screwed or otherwise suitably secured in a manner allowing it to be removed when necessary. The fan shroud 58 projects through panel 88 so that the intake side of fan 56 is exposed to the atmosphere.

In operation of the photoreproductive machine in the projection mode, the high intensity light which is generated within the lightbox is diffused by panel 42 and filtered by panel 44 such that the predominant wavelength that passes through the filter panel is 530 nanometers (plus or minus about 25 nanometers). The light is directed through the transparency 24 which is carried on the chase 23, and the light is then focused by lens 28 and the other optical components onto the vacuum film holding screen 16 such that the film is exposed in a pattern corresponding to that of the image on the transparency 24. The exposure time should be relatively short, preferably no more than 5–10 seconds. The circular arrangement of the lamps 46 and reflectors 52 results in improved light distribution in the back lighting that is provided by the boxlight 10. In particular, the lighting distribution achieved by the circular lamp arrangement is effective in substantially reducing the adverse effects of the cosine fourth losses that have heretofore plagued this type of system.

Figure 5:
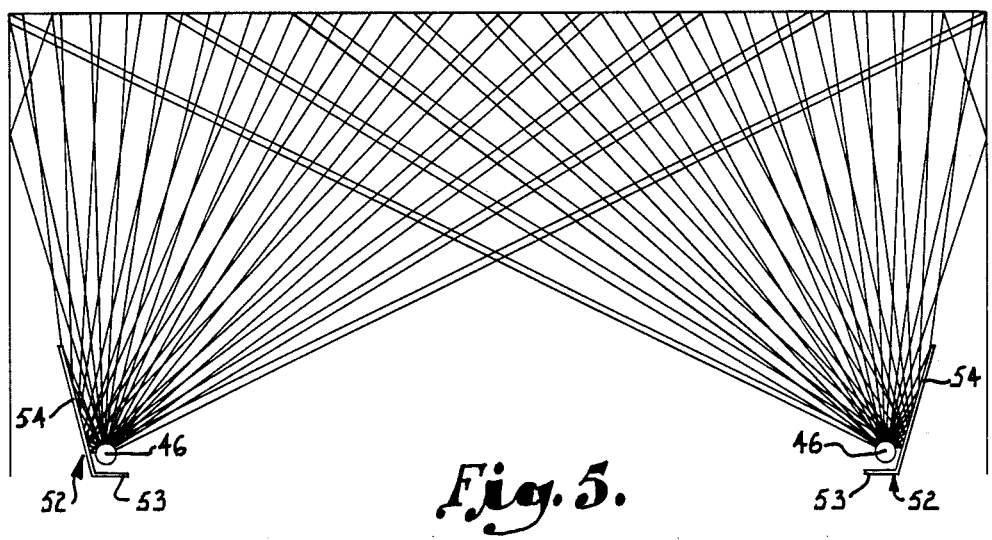
FIG. 5 is a diagrammatic view showing the light ray trace at increments of 5 degrees effected by the reflectors in the boxlight.

As is evident from the light ray trace shown diagrammatically in FIG. 5, the orientation of the reflective panels 54 at approximately 15° from the optical axis causes the intensity of the light to be greatest near the periphery of the image plane and to progressively decrease toward the center or optical axis. Because of the circular arrangement of the lamps 46 and reflectors 52, this light distribution pattern is symmetrical about the optical axis and is exactly opposite to that which is caused by the cosine fourth phenomenon. As a consequence, the cosine fourth losses are substantially negated by the light distribution that results from the circular arrangement of the lamps and reflectors in the lightbox 10.

The overall result is that the light which is projected through the film transparency 24 and focused on the film after being diffused and filtered by panels 42 and 44 has an intensity pattern that is more uniform and does not fall off near the margins. The light is projected by lens 28 in the same pattern and is focused on the easel 16 in order to produce a sharply defined image in which the halftone dots are recorded even at the margins when four color film separations are being processed. The light intensity pattern provided by the boxlight is able to reduce nearly to the point of elimination the adverse effects of the cosine fourth phenomena which has heretofore plagued photographic systems.

In addition to the improved lighting effect, the circular arrangement of the light source allows it to be more effectively and uniformly cooled. The cooling air is fanned out radially in all directions in equal amounts by the air deflector 64, and the annular slot 70 focuses the air flow on the lamps 46 and the adjacent reflectors 52. The air is directed around each lamp 46 and is not concentrated at the ends of the lamp but is instead uniform along the entire length of the glass envelope of each lamp. In addition, the air flows between each lamp and the base 53 and then forwardly between the lamp and the reflective panel 54 prior to discharging through the vent openings 74. This air circulation pattern cools the entirety of the boxlight compartment 40 while maintaining a smooth flow of air and avoiding turbulence. At the same time, the skewed fan shroud 58 and stiffener channel 84 keep the back panel 38 from vibrating during operation of the fan and possibly causing optical problems due to vibration.

The boxlight 10 of the present invention is constructed in a manner making it well suited for the provision of an isolation chamber between the boxlight and chase in order to further isolate the heat generated within the boxlight from the film transparency which is held on the chase. FIG. 6 depicts an improved structure for providing an isolation chamber 89 in front of the boxlight. The isolation chamber is open at the bottom and is provided at the top with a fan 90 which draws air into the bottom of chamber 89 and circulates it generally from bottom to top through the isolation chamber before discharging it to the rear. The isolation chamber 89 has closed opposite sides 92, and at least one of the sides 92 is mounted on a pair of hinges 94. The hinges 94 are secured to a vertical support 96 which extends from the overhead rail 18. The side 92 which is hinged may be swung about the vertical axis defined by the hinges 94 from the closed position shown in FIG. 6 to an open position in which the side of the isolation compartment 89 is accessible. Preferably, the diffuser panel 42 and the filter panel 44 may be removed from their slideways by sliding them out through the open side of the compartment. This permits the panels 42 and 44 to be inspected and replaced if necessary and it also provides convenient access to the lamps 46 for replacement of them and for inspection or servicing of any of the other components within the boxlight compartment 40.

A pair of parallel masks 98 are provided at the front of the isolation chamber 89 affixed to the back of the subject holder 22. The masks 98 are spaced apart from one another by standoff dimples 100 and are open at their centers to define an opening through which the light from lightbox 10 may pass toward the film transparency. The masks 98 constitute heat shields whose purpose is to prevent thermal energy from reaching the back of the chase holder 22 and the chase 23 which holds the transparency being copied. Whereas Wally U.S. Pat. No. 4,582,406 discloses a single plate acting as a baffle in the isolation chamber, it has now been discovered that the provision of the two masks in an arrangement allowing cooling air to be pulled around them and between them offers enhanced protection against adverse thermal effects. The masks 98 ar preferably made of aluminum or another material having good heat absorbing characteristics.

The isolation compartment 89 provides additional protection of the film transparency 24 from the heated boxlight compartment 40. Fan 90 operates to draw ambient air into the bottom of the isolation chamber 89 and to discharge the air to the rear of the boxlight after it has passed upwardly through the entirety of the isolation chamber. The air is also drawn between and around the two masks 98 (and between chase holder 22 and the nearer mask) to provide additional cooling. Thus, even if the boxlight compartment is relatively hot, the additional cooling provided by the isolation chamber 89 and the heat shielding masks prevents the transparency from being heated sufficiently to change its size or damage it. At the same time, the hinged side 92 of the isolation chamber may be opened to provide convenient access for cleaning or inspection of panels 42 and 44, as well as servicing of the components within the boxlight compartment.

The improved results obtained by the boxlight of the present invention have been empirically verified. Data as to the relative intensity of light impinging on various areas of a subject holder were taken both with the subject boxlight used and with a conventional boxlight used. The intensity readings were taken with a meter located on the face of the subject holder or chase without a screen tint or green filter. The results showed that the ratio between the intensity in the corner areas of the chase and the center of the chase was 0.810 for the conventional boxlight and 0.912 for the subject boxlight. With the geometry used, the cosine fourth factor was calculated as 0.907.

Theoretical calculations were made to predict the effect on halftone dot loss that would result from this intensity difference between the conventional boxlight and the subject boxlight, and data were taken that verified the accuracy of the theoretical calculation. Theoretically, the transmission of light through a grid area containing a halftone dot is given by the equation $T = 1 - D$, where T is the transmission factor for the light and D is the fractional dot area (i.e., the area occupied by the dot divided by the total area of the grid area). Thus, the transmission factor T is 1 (full light transmission) if there is no dot in the grid area ($D=0$) and is zero if the dot covers the entire grid area ($D=1$). From the fundamental transmission equation, it follows that the (apparent) change in dot area $\Delta D$ caused by a change $\Delta T$ in the light transmission (relative intensity) is given by the expression $D = -\Delta T$.

Using the data mentioned above, the predicted change in the net relative intensity at the corners can be predicted. Subtracting 0.810 (the relative intensity with the conventional boxlight) from 0.912 (the relative intensity with the subject boxlight) gives 0.102. Subtracting from this the effect of the cosine fourth phenomena (given as one — the cosine fourth factor expressed above) or $1 - 0.907 = 0.093$ yields $0.102 - 0.093$ or 0.009 which can be approximated as 0.01. This result is a $\Delta T$ of 0.01 or a 1% gain. Thus, the prediction from this result is that $\Delta D = -\Delta T = -0.01$ which predicts a 1% dot loss.

This prediction has been experimentally verified. A 5% screen tint (on "dupe" film) at the subject holder was used in the experiment, and densitometer readings were taken at all grid points with the subject boxlight and with the conventional boxlight. With the conventional boxlight, the readings were 96% at the center and 98% at the corners, indicating that 2% dots could not be held at the corners (but 3% and larger dots could. With the subject boxlight, the readings were 96% at the center and 97% at the corners, indicating that 1% dots could not be reliably held but 2% and larger dots could be. This experimental result verifies the theoretical prediction that the subject boxlight slightly overcompensates (by about 1%) for cosine fourth losses and thus provides an improved light source allowing the system to hold all dots except perhaps 1% dots at the very corners. This is to be contrasted with the conventional boxlight which cannot hold 2% dots, and it is noted that this improvement is of considerable importance in high quality halftone work where the ability to hold 1% dots is considered to be of great significance.

The boxlight is able to consistently produce these improved results (holding 1% dots in the corners) in the photoreproduction system so long as a high quality lens is used and the lens focal length is appropriate, the same cone angle is used, and the geometry is scaled up or down with whatever size changes are involved.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, we claim:

1. Photoreproduction apparatus comprising:
   a frame;
   a chase on the frame for holding a transparency which is to be projected;
   means on the frame for holding photosensitive material onto which the transparency is to be projected to produce a photoreproduction of the transparency;
   lens means on the frame between said chase and film holding means for focusing light passing through the transparency on the film, said lens having an optical axis;
   a boxlight on the frame providing a compartment having an open side facing toward said chase to direct light from within said compartment toward the chase;
   a diffuser on said open side of the boxlight compartment for diffusing light emanating from within said compartment;
   lighting means for generating high intensity light in said boxlight compartment from a light source comprising a plurality of elongate high intensity lamps arranged generally end to end to form the general shape of a circle which is substantially centered on said optical axis and contained in a plane oriented substantially perpendicular to said optical axis; and
   a reflector for each high intensity lamp, each reflector having a reflective base and a reflective panel located radially outwardly from the lamp at an angular orientation to reflect light from the lamp in a manner to concentrate the reflected light at the marginal areas of the transparency to substantially negate cosine fourth intensity losses at said marginal areas.

2. Apparatus as set forth in claim 1, including:
   means for ventilating said boxlight compartment in a pattern passing air along substantially the entirety of said circle for cooling said light source; and
   vent means for venting the air from said boxlight compartment.

3. Apparatus as set forth in claim 1, wherein each reflective panel is oriented at an angle of approximately 15° relative to said optical axis.

4. Apparatus as set forth in claim 1, including:
   fan means for forcing cooling ambient air into said boxlight compartment at a location substantially centered on said optical axis;
   a deflector in the boxlight having a generally conical deflecting surface located and arranged to deflect the air generally radially outwardly away from said optical axis toward the lamps; and
   vent means on the boxlight for venting the air from said compartment.

5. Apparatus as set forth in claim 4, wherein said deflecting surface is concave on a side thereof exposed to incoming air.

6. Apparatus as set forth in claim 4, wherein said boxlight has a back wall opposite said open side and a pair of opposite sides and top and bottom walls, said fan means having a discharge side adjacent said back wall for introducing air into the boxlight compartment.

7. Apparatus as set forth in claim 6, including a reflector panel spaced from said back wall of the boxlight and located within said circle to provide a generally annular slot for directing the air from said deflector toward said lamps.

8. Apparatus as set forth in claim 6, wherein said vent means comprises a pair of vent slots in the respective top and bottom walls adjacent said open side of the boxlight compartment.

9. Apparatus as set forth in claim 8, including a baffle for each vent slot on the outside of the boxlight oriented to deflect air passing through the corresponding vent slot in a direction generally away from said open end.

10. Apparatus as set forth in claim 6, wherein:
    said back wall has a pair of substantially vertical edges and a pair of substantially horizontal edges;
    said fan means has a discharge presenting edges skewed from horizontal and vertical to provide stiffening of the back wall.

11. Apparatus as set forth in claim 10, including a stiffener on said back wall extending around said discharge of the blower means and having edges skewed from horizontal and vertical.

12. Apparatus as set forth in claim 4 wherein said deflector is arranged to direct air between each lamp and the reflective base and panel of the corresponding reflector.

13. Apparatus as set forth in claim 1, including:
    an isolation chamber between said boxlight and chase, said isolation chamber having opposite sides and being open at the bottom to allow ingress of air into the isolation chamber from the bottom; and
    fan means on top of said isolation chamber for drawing air into the bottom thereof and circulating air through the isolation chamber from bottom to top.

14. Apparatus as set forth in claim 13, including:
    means for mounting one side of said isolation chamber for movement between open and closed positions; and
    means for mounting said diffuser on said open side of the boxlight compartment in a manner permitting removal of the diffuser and at a location wherein the diffuser is accessible for removal thereof when said one side of the isolation chamber in the open position.

15. Apparatus as set forth in claim 13, including a pair of heat shielding masks between said isolation chamber and chase, said masks being spaced apart from one another and from the chase to allow air drawn into the isolation chamber by said fan means to circulate between and around said masks.

16. In a photoreproduction system of the type in which light is projected through a transparency and a diffuser plate and is focused by an objective lens onto photosensitive material to photographically reproduce the image on the transparency, the improvement comprising:
   a boxlight presenting therein a boxlight compartment open to light passage on one side for directing light from the boxlight toward the transparency;
   means for mounting the diffuser plate on said open side of the boxlight compartment;
   a high intensity light source in said boxlight compartment arranged generally in a circle occupying a plane substantially parallel to the diffuser plate when the latter is mounted on said open side of the boxlight compartment, said light source having an energized condition wherein high intensity light is generated from said circle; and
   means for introducing ambient air for cooling into the boxlight compartment at a location within said circle and directing the ambient air radially outwardly from said location past said light source along substantially the entire circumference of said circle.

17. The improvement of claim 16, including a reflective surface in the boxlight compartment located outwardly of said circle and oriented at an angle of approximately 105° relative to the plane of said circle for reflecting light from the light source toward said openside of the lightbox compartment.

18. The improvement of claim 16, wherein said light source comprises a plurality of individual high intensity lamps arranged generally end to end in a pattern defining said circle.

19. The improvement of claim 18, including a reflector for each lamp having a reflective surface located outwardly of the lamp and oriented at approximately 105° relative to the plane of the circle.

20. The improvement of claim 16, wherein said means for introducing and directing ambient air comprises:
   fan means for forcing ambient air into said boxlight compartment at said location, said location being situated behind and generally centered on said circle;
   an air deflector in said boxlight presenting thereon a generally conical deflecting surface in the path of the ambient air entering the boxlight compartment, thereby deflecting the incoming air radially outwardly in all directions toward said circle for cooling of the light source; and
   vent means for venting air from said boxlight compartment at a location outwardly of said circle.

21. A boxlight for generating high intensity light for a projection type photoreproduction process, said boxlight comprising:
   a boxlight structure providing therein a boxlight compartment which is substantially enclosed except on an open face of the compartment;
   a source of high intensity light mounted in said boxlight compartment in a configuration generally defining a circle occupying a plane oriented generally parallel to said open face;
   means in said boxlight compartment for reflecting light from the light source generally toward said open face; and
   means for circulating ambient air through said compartment in a generally radial path from the center of the circle outwardly across substantially the entirety of the circle for cooling of the light source.

22. The boxlight of claim 21, wherein said circulating means comprises:
   a fan operable to force air into the boxlight compartment in a direction generally perpendicular to the plane of the circle and at a location substantially centered on the circle;
   a deflector in said boxlight compartment having a generally conical deflection surface located in the path of the incoming air to fan the air outwardly along said deflection surface in said radial path; and
   vent means for venting air from the boxlight compartment.

23. The boxlight of claim 22, including means for providing a generally circular slot in the path of the air deflecting from said deflection surface, said slot being oriented to direct the air toward the light source.

24. The boxlight of claim 21, wherein said light source comprises a plurality of elongate lamps arranged generally end to end in a pattern defining said circle.

25. The boxlight of claim 24, wherein said light reflecting means comprises a reflector for each lamp having a reflective surface located outwardly thereof and oriented at an angle to reflect light from the lamp in a manner to concentrate the reflected light at the margins of said open face of the boxlight compartment.

26. Photoreproduction apparatus for projecting transparency images in the form of a plurality of halftone dots each of which is 1% dot or larger;
   a frame;
   a chase on the frame for holding a substantially rectangular transparency which bears the image to be projected;
   means on the frame for holding photosensitive material onto which the transparency is to be projected to produce photoreproduction of the transparency;
   lens means on the frame between said chase and film holding means for focusing light passing through the transparency on the film, said lens having an optical axis;
   a boxlight on the frame providing a compartment having an open side facing toward said chase to direct light from within said compartment toward the chase;
   a diffuser on said open side of the boxlight compartment for diffusing light emanating from within said compartment;
   a narrow band filter for filtering light at wavelengths outside of a selected range; and
   lighting means for generating high intensity light in said boxlight compartment from a light source arranged in a manner to counteract cosine fourth losses such that halftone dots are held in the corner areas of the transparency so long as the halftone dots are larger than 1% dots.

* * * * *